R. C. RACER.
RESILIENT WHEEL.
APPLICATION FILED SEPT. 11, 1918.

1,302,215.

Patented Apr. 29, 1919.
2 SHEETS—SHEET 1.

R. C. Racer
Inventor,

Witness

By
Attorneys

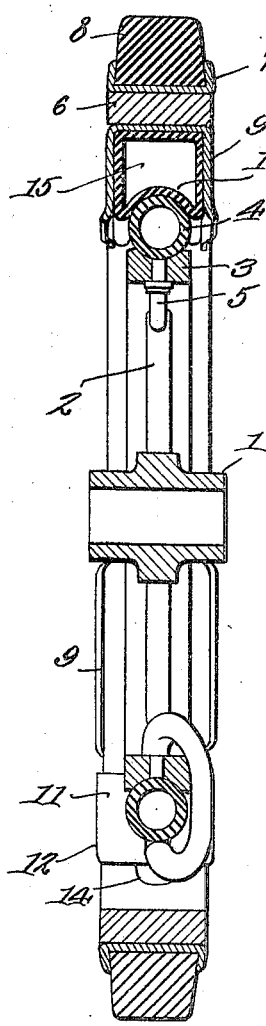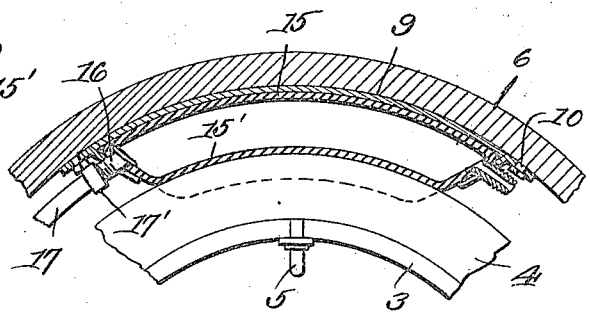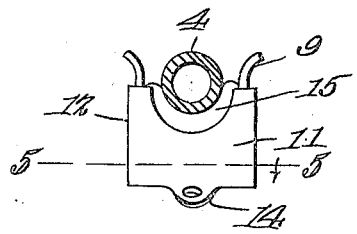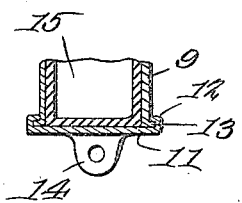

UNITED STATES PATENT OFFICE.

ROSCOE C. RACER, OF SALT LAKE CITY, UTAH.

RESILIENT WHEEL.

1,302,215.  Specification of Letters Patent.  Patented Apr. 29, 1919.

Application filed September 11, 1918. Serial No. 253,585.

*To all whom it may concern:*

Be it known that I, ROSCOE C. RACER, a citizen of the United States, residing at Salt Lake City, in the county of Salt Lake and State of Utah, have invented a new and useful Resilient Wheel, of which the following is a specification.

The subject of this invention is a resilient wheel intended for use on motor vehicles and the like.

The main object of the invention is the provision of a wheel having pneumatic supporting means so situated as to be protected from puncture.

Another object of the invention is the provision of pneumatic cushions for supporting an inner wheel.

The invention also contemplates generally improving the construction and enhancing the utility of pneumatic wheels.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Fig. 2 is a section on the line 2—2 of Fig. 1;

Fig. 3 is a fragmentary view showing one of the pneumatic cushions in longitudinal section;

Fig. 4 is a detail sectional view taken on the line 4—4 of Fig. 1;

Fig. 5 is a section taken on the line 5—5 of Fig. 4.

Figure 1:
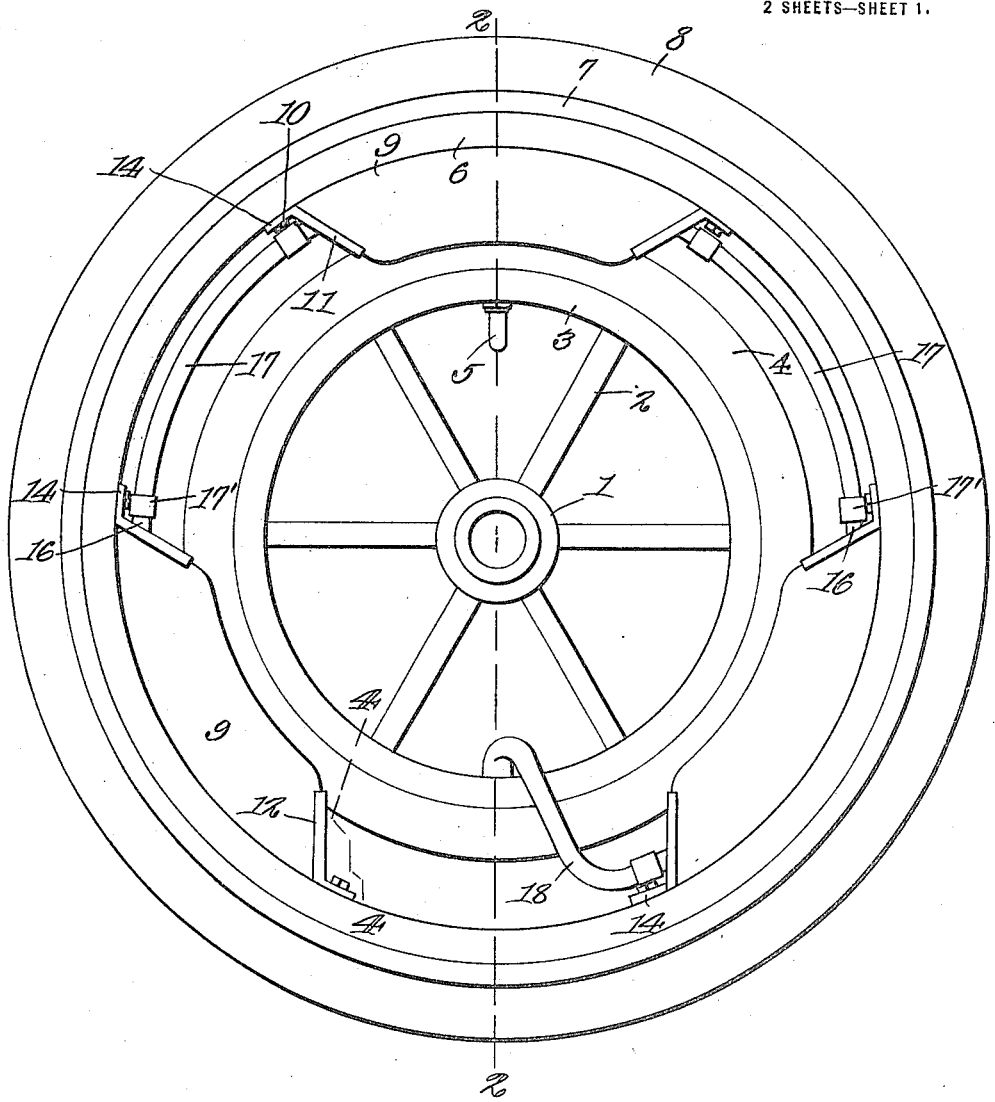
Figure 1 is a view in side elevation of a wheel constructed in accordance with the invention.

Referring to the drawings by numerals of reference:—

In carrying out the invention, there is provided a hub 1 from which radiate the spokes 2, supporting a felly 3. A pneumatic tire 4 encircles the wheel thus formed, and is seated upon the felly 3. This tire is preferably of the single tube type and is provided with the usual valve, indicated by the numeral 5, through which the tire may be inflated.

An outer felly 6 is concentric with and spaced from the tire 4, and is encircled by a rim 7 which forms a seat or support for a tire 8, which tire is, by preference, of solid rubber. Secured to the inner face of the felly 6, and spaced circumferentially thereof, are boxes 9 which are attached to the felly by screw bolts 10 or otherwise. The boxes 9 are formed of aluminum or other suitable material, and are opened at their inner faces. The ends of the boxes are closed by the removable plates 11, the side edges 12 of which are turned back to form grooves for the reception of the flanges 13 which project outwardly from the ends of the sides of the box. Apertured lugs 14 are formed on the ends 11 for the reception of the screw bolts 10.

Within each box 9 is placed a pneumatic cushion 15 the inner face of which is formed to conform, generally, to the configuration of the tire 4, and is depressed or cupped, as indicated at 15', to cause the cushion to adhere closely to the tire. The cushions are provided with threaded nipples 16 through which they are connected by unions 17' to pipes 17, thus placing the interiors of all the cushions in communication, and the cushions are placed in communication with the tire 4 through a nipple 16 of one of the cushions being connected to a pipe 18 which extends from the tire 4, either in the manner shown or from any other suitable portion of the tire, as from the tread. It is thus seen that all the cushions and the tire are under the same air pressure.

As will be understood, the ends 11 of the boxes are apertured to permit the passage of the nipples 16 therethrough, and are removable to permit insertion and removal of the cushions.

It is thought that the operation of the wheel will be amply understood from the foregoing description without a special and extended explanation thereof.

Having thus described the invention, what is claimed as new and sought by Letters Patent, is:—

A resilient wheel, including an inner wheel, a resilient tire on the inner wheel, an outer rim concentric with and spaced from the resilient tire, boxes secured to the inner face of the outer rim and spaced circumferentially thereof, pneumatic cushions in the boxes and engaging the resilient tire, and detachable elements on the boxes for securing the cushions in place.

In testimony that I claim the foregoing as my own, I have hereto affixed my signature in the presence of two witnesses.

ROSCOE C. RACER.

Witnesses:
A. J. PAULSON,
FRED W. CHAMBERS.